United States Patent
Hoefle et al.

(10) Patent No.: US 10,086,580 B2
(45) Date of Patent: Oct. 2, 2018

(54) HYBRID COMPONENT AND PRODUCTION METHOD

(71) Applicant: DIEHL AIRCABIN GMBH, Laupheim (DE)

(72) Inventors: Roland Hoefle, Friedrichshafen (DE); Ralf Gerner, Weissenhorn (DE); Dirk Pfinder, Balzheim (DE)

(73) Assignee: DIEHL AIRCABIN GMBH, Laupheim (DE)

( * ) Notice: Subject to any disclaimer, the term of this patent is extended or adjusted under 35 U.S.C. 154(b) by 634 days.

(21) Appl. No.: 14/421,004

(22) PCT Filed: Feb. 14, 2014

(86) PCT No.: PCT/EP2014/000413
§ 371 (c)(1),
(2) Date: Feb. 11, 2015

(87) PCT Pub. No.: WO2014/127899
PCT Pub. Date: Aug. 28, 2014

(65) Prior Publication Data
US 2015/0217536 A1    Aug. 6, 2015

(30) Foreign Application Priority Data
Feb. 20, 2013 (DE) .................... 10 2013 002 893

(51) Int. Cl.
*B32B 1/08* (2006.01)
*B29C 65/50* (2006.01)
(Continued)

(52) U.S. Cl.
CPC .............. *B32B 1/08* (2013.01); *B29C 65/002* (2013.01); *B29C 65/5014* (2013.01);
(Continued)

(58) Field of Classification Search
CPC ... F16L 9/12; F16L 9/121; F16L 9/123; F16L 9/133; F16L 9/14; F16L 9/147; F16L 9/17; F16L 9/21; F16L 9/22; B60H 1/00557; B60H 1/00564; B60H 1/00571; B60H 1/00578; Y10T 428/1362; Y10T 428/1372;
(Continued)

(56) References Cited

U.S. PATENT DOCUMENTS

| 6,586,110 B1 * | 7/2003 | Obeshaw ............ B21C 37/15 138/148 |
| 2007/0292647 A1 | 12/2007 | Princell |
| 2009/0260706 A1 | 10/2009 | Hesse et al. |

FOREIGN PATENT DOCUMENTS

| DE | 102005023148 A1 | 11/2006 |
| JP | 6328602 A2 | 11/1994 |
| JP | 1000108209 A2 | 4/2000 |

OTHER PUBLICATIONS

International Search Report dated May 8, 2014 issued in PCT/EP2014/000413.

* cited by examiner

*Primary Examiner* — Walter Aughenbaugh
(74) *Attorney, Agent, or Firm* — Scully, Scott, Murphy & Presser, P.C.

(57) ABSTRACT

The present application relates to a hybrid component and a method for producing the same. The proposed hybrid component comprises a basic element (2) having at least one portion which is formed as a laminate (3) from a plastics foam and a fiber composite plastic.

13 Claims, 5 Drawing Sheets

(51) Int. Cl.
| | |
|---|---|
| B29C 65/00 | (2006.01) |
| B60H 1/00 | (2006.01) |
| B64D 13/00 | (2006.01) |
| B32B 5/24 | (2006.01) |
| B64C 1/00 | (2006.01) |
| F16L 9/21 | (2006.01) |
| F16L 9/22 | (2006.01) |
| B29C 53/38 | (2006.01) |
| B29L 31/30 | (2006.01) |
| B29K 105/04 | (2006.01) |
| B29K 27/00 | (2006.01) |
| B29K 81/00 | (2006.01) |
| B29L 9/00 | (2006.01) |

(52) U.S. Cl.
CPC ...... *B29C 65/5021* (2013.01); *B29C 65/5057* (2013.01); *B29C 65/5078* (2013.01); *B29C 65/5085* (2013.01); *B29C 66/1142* (2013.01); *B29C 66/432* (2013.01); *B29C 66/4322* (2013.01); *B29C 66/49* (2013.01); *B29C 66/721* (2013.01); *B29C 66/727* (2013.01); *B29C 66/72341* (2013.01); *B29C 66/73921* (2013.01); *B32B 5/245* (2013.01); *B60H 1/00564* (2013.01); *B64C 1/00* (2013.01); *B64D 13/00* (2013.01); *F16L 9/21* (2013.01); *F16L 9/22* (2013.01); *B29C 53/38* (2013.01); *B29C 66/1122* (2013.01); *B29C 66/5326* (2013.01); *B29C 66/53462* (2013.01); *B29C 66/71* (2013.01); *B29C 66/7212* (2013.01); *B29C 66/72141* (2013.01); *B29C 66/72143* (2013.01); *B29C 66/7394* (2013.01); *B29K 2027/16* (2013.01); *B29K 2081/06* (2013.01); *B29K 2105/046* (2013.01); *B29L 2009/00* (2013.01); *B29L 2031/3041* (2013.01); *B29L 2031/3076* (2013.01); *B32B 2266/08* (2013.01); *B32B 2605/18* (2013.01); *B64C 2001/0072* (2013.01); *B64D 2013/003* (2013.01); *Y02T 50/44* (2013.01); *Y02T 50/56* (2013.01); *Y10T 156/10* (2015.01); *Y10T 428/1314* (2015.01); *Y10T 428/1372* (2015.01); *Y10T 428/1376* (2015.01); *Y10T 428/197* (2015.01)

(58) Field of Classification Search
CPC ........... Y10T 428/1376; Y10T 428/139; Y10T 428/1393; B32B 5/18; B32B 5/22; B32B 5/24; B32B 5/245; B32B 5/26; B32B 5/32
See application file for complete search history.

HYBRID COMPONENT AND PRODUCTION METHOD

The present application relates, in particular, to a hybrid component and a corresponding production method.

In particular in the field of aviation, as well as in other fields of passenger and goods transport and the weight of the components used for the construction of corresponding vehicles is an important or not insignificant factor. Specifically with regard to improving energy efficiency, there is a constant striving to improve, i.e. reduce, component weights as far as possible.

In the field of aviation, inter alia fiber-reinforced plastics, in part having a honeycomb core, are used as lightweight components for cabin trim elements, air conditioning pipes, etc. Although these components are already comparatively lightweight, a further weight reduction would still be desirable.

On the basis of the above, it is an object of the invention to eliminate the drawbacks according to the prior art. In particular, a component for vehicles which is reduced in weight in comparison to known lightweight components and nevertheless has sufficient mechanical stability, is intended to be defined.

This object is achieved by virtue of the independent and subordinate claims. Embodiments emerge, in particular, from the dependent claims and subclaims.

According to patent claim 1, a hybrid component for vehicles, in particular aircraft, is provided, comprising a basic element having at least one portion which is formed as a laminate from a plastics foam or plastics foam material and a fiber composite plastic or fiber-plastic composite, and wherein the basic element comprises at least one surface portion which is formed from a plastics foam and is of laminate-free design.

By laminate-free should be understood, in particular, that the surface portion is configured free from laminate. This should mean, in particular, that a surface portion of the plastics foam material is free from connection to fiber composite plastic, in particular is exposed. The surface portion is preferably constituted by an outer surface portion, i.e. in particular not by a portion of an inner cavity or of an inner closed volume of the hybrid component. Preferably, the laminate-free surface portion borders directly on the portion configured as a laminate. Hence a comparatively lightweight hybrid component, in particular, is obtained.

The proposed hybrid component can in this respect comprise a basic element, formed substantially from a plastics foam, which basic element, in particular in one or more predefined portions, which together, however, do not form the basic element, is connected, in particular bonded, to a fiber composite material. It should here be mentioned that the plastics foam material, in the case of the herein proposed hybrid component, is not configured as core material for the whole of the basic element, which implies that there are laminate-free regions, in particular surface regions.

By the term laminate should be understood, in particular, that the at least one portion has a layer structure consisting of a plurality of bonded together layers, wherein the individual layers are here formed either from plastics foam, in particular from a sheet-like plastics foam material, or from fiber composite plastic.

For the hybrid component, lamination with the fiber composite plastic provides possibilities for local mechanical reinforcement of the plastics foam material of the basic element. It has transpired that the local application of the fiber composite plastic in particular for pipes, particularly air supply and extraction pipes, more particularly air conditioning pipes, is sufficient, in particular with regard to mechanical stability. Owing to the local application of the fiber composite plastic by lamination, in a basic element produced on the basis of the plastics foam material there are regions, more precisely surface regions, of the plastics foam material which are exposed, i.e. are not covered and laminated by fiber composite material. In this respect, regions can be present which are formed fully or solely from the plastics foam. This is advantageous, in particular, with regard to low component weights. Preferably, the plastics foam, at least in the exposed regions, is of closed-cell configuration.

As a result of the local regions with laminate, i.e. the partial coverage and lamination with the fiber composite plastic, reinforcement regions can be purposefully configured so as thus to be able to achieve or satisfy the respectively necessary mechanical properties and requirements, in particular with respect to dimensional stability, and viscoelastic properties.

The individual component parts of the laminate, in particular the layers, are here connected, in particular bonded, to one another in particular by material bonding. The integral connection can here be produced, in particular, by the plastics material of the fiber composite plastic. The use of a different suitable adhesive, in particular an adhesive with which portions or segments of the plastics foam material can be bonded to one another, is also possible, however.

Through the use of a plastics foam, in particular a weight which is reduced in relation to known lightweight construction materials in which fiber composite materials are used either as solid material or in combination honeycomb cores, can be achieved.

In addition, by combining the plastics foam with the fiber composite material to form a laminate structure, a particularly advantageous mechanical strength, in particular tensile strength, and dimensional stability can be achieved. Outside of the at least one portion configured as a laminate, the viscoelastic properties of the plastics foam material are substantially preserved, while in the region of the laminate the viscoelastic properties are restricted.

The limitation or restriction of the viscoelastic properties leads, in particular, to increased stiffness of the basic element, which leads to improved dimensional stability, in particular under temperature, moisture and/or pressure fluctuations.

A further advantage of the proposed hybrid component can be seen in the fact that the plastics foam material, in comparison to components made of fiber-reinforced plastics in solid material or in honeycomb construction, has a significantly smaller heat transfer coefficient, and thus, as such, has advantageous thermal insulation properties. According to requirements, it may be possible for additional insulations, as are usually necessary, for instance, in air conditioning pipes made of plastic composite material, to be waived, due to the advantageous insulation properties of the plastics foam material. In particular in components having insulation requirements, simplifications in production and correspond reductions in production costs are attainable by virtue of the higher component integrity.

In some embodiments, it is provided that the basic element of the hybrid component, outside of the at least one portion, i.e. say in the laminate-free region, formed substantially from the plastics foam or plastics foam material. This means, in particular, that the basic element can comprise segments which are formed purely from plastics foam and segments which are configured as a laminate. The segments configured as a laminate, that is to say the at least one portion, can here advantageously assume the task of providing mechanical reinforcement and stabilization. The laminate-free segments, which can be formed substantially fully from the plastics foam material, have substantially the viscoelastic properties of the plastics foam material, and in this respect exhibit higher flexibility and/or pliability in relation to the laminate. With the at least one portion configured as a laminate, changes in shape which are otherwise observed in the plastics foam material as a result of temperature, pressure and/or moisture influences, in particular changes in length, can be avoided, or at least very largely suppressed. In other words, in the laminated portions a comparatively high dimensional stability can be achieved, while in the laminate-free portions the flexibility of the plastics foam material can be preserved. In the direction or dimension reinforced by the laminate, increased dimensional stability can thus be achieved, while increased flexibility is present in the non-reinforced direction or dimension.

In some embodiments, it is provided that the plastics foam is substantially formed from a plastomer or thermoplastic, or from thermoplastic plastics material. Surprisingly, it has been shown that foamed thermoplastic plastics materials are suitable for being laminated with fiber composite plastics, such as, for example, so-called prepregs. In the lamination, the foam structure of the plastics foam material can be substantially preserved, or, in other words, the lamination process leads to no relevant or significant degeneration of the plastics foam material. In particular, foam materials made of PVDF (polyvinylidene fluoride) and PPSU (polyphenylsulfone) have proved suitable.

In some embodiments, the fiber composite plastic comprises as plastics material a (cured) duromer or a duroplastic material. In particular in the laminate with the plastics foam material, the duromer is in the cured state and in this way locally reinforces the mechanical strength of the hybrid component. In variants, the fiber composite plastic can comprise as fibers glass fibers, carbon fibers and/or aramid fibers, with which, in particular, the tensile strength of the laminate can be markedly improved. In the production of the hybrid component, in particular fiber-matrix semifinished products, in particular prepregs, can be used, in which the fibers, i.e. reinforcement fibers, are impregnated with a plastics matrix. In variants, the fibers exist in the form of a woven fabric, bonded fabric, knitted fabric, lattice fabric and/or as a nonwoven fabric.

In some embodiments, the plastics foam material and the fiber composite plastics material are chosen such that the melting temperature of the plastics foam is greater than a curing temperature of the duromer. In this conformation, in particular, in the curing of the duromer, for instance under temperature and pressure, the foam structure, and thus also the insulating effect of the plastics foam material, can be effectively maintained.

In some embodiments, the plastics foam, i.e. the plastics foam material, is of fluid-tight, in particular airtight configuration. Airtight is here intended to mean that air, in particular ambient air, cannot penetrate the plastics foam material per se. In particular, the plastics material is intended to be airtight with respect to respiratory air which is present or is used in vehicles, in particular aircraft. Appropriate plastics foam materials are suitable, in particular, for producing pipelines or pipes for air supply and/or extraction systems and/or air conditioning systems.

In some embodiments, it is provided that the plastics foam can be constituted by a closed-cell foam material. With closed-cell foam materials, advantageous insulation properties can in particular be achieved. Moreover, such materials are generally sufficiently tight with respect to fluids, in particular water and/or air, so that they are particularly good for the production of pipes or pipe sections for air supply and/or extraction and/or air conditioning purposes.

Furthermore, surfaces of closed-cell foams can be comparatively well and effectively coated, for instance with lacquers and/or priming materials for paint finishes, etc.

In some embodiments, it is provided that the plastics foam has a density between 20 kg/m$^3$ or 30 kg/m$^3$ and 75 kg/m$^3$, preferably between 20 kg/m$^3$ or 30 kg/m$^3$ and 40 kg/m$^3$, further preferably between 20 kg/m$^3$ or 30 kg/m$^3$ and 35 kg/m$^3$, or between 20 kg/m$^3$ and 30 kg/m$^3$. Plastics foams of this kind exhibit, on the one hand, sufficient mechanical strengths to form, in combination with the portion or portions configured as a laminate, self-supporting components or structures. On the other hand, they enable comparatively low component weights, which is a considerable advantage, in particular in the field or aviation technology and aircraft interior fittings.

In some embodiments, the at least one portion comprises a segment in which the fiber composite plastic is disposed between two layers of plastics foam. This variant or embodiment is in this respect, the normal direction of the component, characterized by a material sequence plastics foam-fiber composite plastic-plastics foam. Or, in other words, between two layers of plastics foam, a layer of fiber composite plastic is present or laminated. In a corresponding embodiment, it is possible to achieve in particular symmetrical layer structures which have a particularly advantageous dimensional stability, in particular including in the production of the laminate.

In some embodiments, the at least one portion can comprise at least one segment in which the plastics foam is disposed between two layers of fiber composite plastic. Here, in the normal direction of the hybrid component, a material sequence fiber composite plastic-plastics foam-fiber composite plastic is obtained. With this structure in particular, advantageous stiffnesses, tensile strengths and dimensional stabilities can be achieved. Apart from this, it is also here possible to achieve a symmetrical structure, which structure is advantageous in terms of dimensional stability.

In further embodiments, it can be provided that two segments of the plastics foam material, which are lain squarely and/or overlappingly one against the other or one upon the other, are covered, in the contact region of the segments and beyond, either on one or both sides with a coating or layer of fiber composite plastic. In this way in particular, as well as also with the two preceding design variants, a plurality of plastics foam parts can be connected to form a larger component, wherein the connection between the individual plastics foam parts can be realized in the region of the laminate and by the laminate. The combination of a plurality of plastics foam parts can advantageously be used in the production of components having curvatures and/or 3D contours. It is also conceivable to join together a plastics foam part, provided as a blank or preform, along edges and/or sections through the fiber composite plastics material in the laminate, so as thus to acquire, in particular, correspondingly three-dimensionally shaped components.

In some embodiments, it is provided that the basic element, at least in some sections, is tubular in shape, wherein, in the at least one portion, contact surfaces of the plastics foam which are mutually abutting, in particular squarely abutting, and/or are lain or lying one upon the other, are bonded together by the fiber composite plastic. In this configuration, in particular pipes and line portions can be produced, wherein the geometry of the pipes, in particular their size, diameter and/or the geometry or the curvature characteristics along the axial axis, can be varied within wide boundaries. Particularly advantageous is that appropriate pipes having almost any chosen curvatures can be produced.

In one variant, the basic element can comprise two half shells, which are made of the plastics foam and are put together to form a tubular hollow body, wherein the half shells are bonded together or connected to each other by the fiber composite material. In particular in this variant, the portions formed as a laminate can extend, in the contact region of the half shells, respectively over the entire axial length of the basic element. In this way, a particularly advantageous stability in the longitudinal direction of the pipe can be achieved, in particular in the event of temperature fluctuations, tensile loads, etc. In the peripheral direction, the basic element formed into a pipe can comprise circumferential portions configured as a laminate. Through appropriate, circumferential reinforcements, in particularly locally, an advantageous dimensional stability in the cross section of the pipe can be achieved. Likewise, by virtue of circumferential laminate portions, at least locally, the cross-sectional shape can be preserved during printing of the pipe, i.e. during pressurization of the pipe interior, as is the case, for example, with air supply lines or air conditioning lines.

In some variants, and as previously already mentioned in connection with one variant, the fiber composite plastic, and thus, in particular, the portion configured as a laminate, can extend in at least one dimension fully over the extent of the basic element. As already mentioned, advantageous dimensional stabilities can thus be achieved. The fiber composite plastic can extend, for instance, along an edge, along a, in particular outer, periphery, i.e. in a locally encompassing manner, along a connecting or butt joint, in particular axially along a butt joint, etc. The fiber composite plastic, and accordingly the portion configured as a laminate, can in particular be provided at any sites or segments at which the basic element is intended to be mechanically stiffened and/or at which two or more plastics foam materials are intended to be connected to one another.

In some embodiments, it can be provided that the plastics foam and/or the fiber composite material, in the at least first portion, varies in thickness in the normal direction of the basic element. Accordingly, mechanical and/or viscoelastic properties of the basic element can be adjusted or varied. In some variants, a variation of the thickness can be given by virtue of a compressed state or compression of the plastics foam. By the term or word family "compression" should here be understood, in particular, that the thickness measured in the normal direction of the basic element is reduced in relation to a non-compressed region which is situated outside of the portion configured as a laminate. In particular, the thickness variation of the plastics foam can be used to shape and/or to configure and realize specific component shapes and geometries. In particular, differences in thickness between segments of pure foam material and segments of pure fiber composite plastic can be bridged in transitional regions with appropriately compressed foam material. Such transitional regions and/or segments or areas of pure fiber composite material can be provided, for instance, on component edges and/or be configured as a flange, in particular, a mounting flange, an air conducting surface and the like.

In some embodiments, it can be provided that at least one portion configured as a laminate, i.e. at least one of the at least one portion configured as a laminate, is adjoined by a laminated region formed, in particular purely, from fiber composite plastic. The laminated region of fiber composite plastic can be configured, for instance, as a flange, lug, sleeve, etc. In particular, hybrid parts configured as pipes can have at the pipe ends corresponding laminated regions of fiber composite plastic. The laminated regions can be used to join together two or more pipes into a pipeline.

According to patent claim 16, a hybrid pipe is provided, in particular for air conditioning applications, wherein the hybrid pipe as configured as a hybrid component in accordance with the above description, in particular in accordance with one of the above-described embodiments and variants. The hybrid pipe can be constituted, in particular, by an air conditioning pipe, in particular for applications in air conditioning systems in aircraft.

According to patent claim 17, a cabin trim element is provided, in particular for aircraft cabins, in particular aircraft cabins wherein the cabin trim element is configured as a hybrid component in accordance with the above description, in particular in accordance with one of the above described embodiments and variants.

Regarding advantages and advantageous effects relating to the hybrid pipe and cabin trim element, reference is made to the statements concerning the hybrid component.

According to patent claim 18, a method for producing a hybrid component is proposed, wherein a plastics foam element and a fiber composite plastics element are connected to each other in a lamination process. Thus an integrated component can be produced in a comparatively cheap and simple manner. In particular, owing to the use of a plastics foam material with insulating effect, thermally insulated components, in particular pipes, can be produced in a single production step.

It should be mentioned that, according to requirement, additives can be added to the foam material, in particular in order to alter the properties of the foam material. For instance, the foam material could comprise electrically conductive particles in order to alter the conductivity of the hybrid component. This could, for instance, to protect against or avoid excessive electrostatic charges.

In embodiments of the production method, the plastics foam element and the fiber composite plastics element is subjected during the lamination process to temperature and/or pressure, in particular such that a fiber composite plastics element comprising a duromer is cured.

In further embodiments of the production method, it can be provided that at least one plastics foam element is provided in sheet-like form, cut to size and/or preformed, in particular in a mold, and that two regions, in particular two loose ends, of the at least one plastics foam element are bonded together in a lamination process by a fiber composite plastics element which hardens in the course of the lamination process. Such a method can be used, in particular, to produce pipes, wherein, in the course of the pipe production, two pipe half shells can be butted one against the other and mutually connected.

Illustrative embodiments of the invention are described in greater detail below with reference to the figures, wherein.

Figure 8:
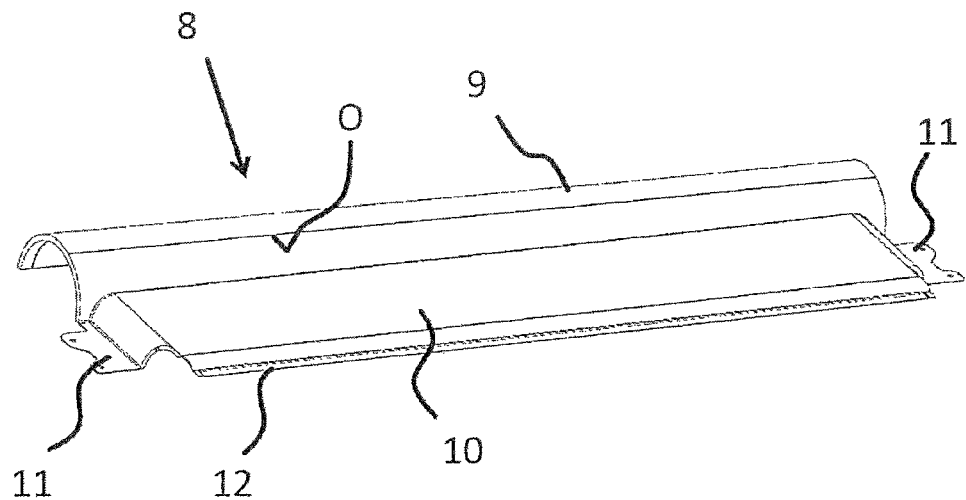
FIG. 8 shows a perspective view of a hybrid component.
Figure 9:
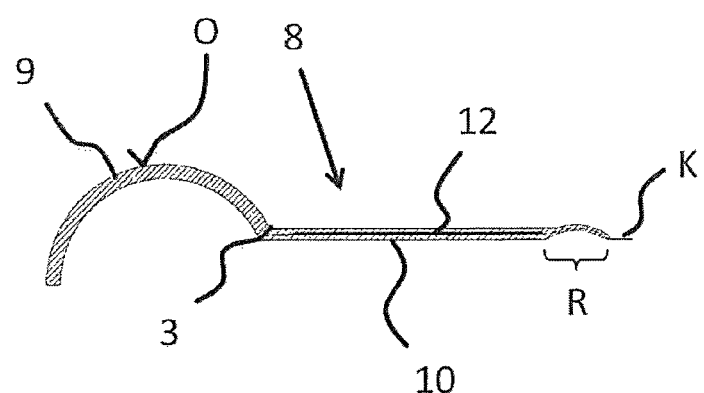

FIG. 9 a sectional representation of the hybrid component of FIG. 8.

In the figures, same or functionally same elements are labeled, as far as possible, with the same reference symbols.

Figure 1:
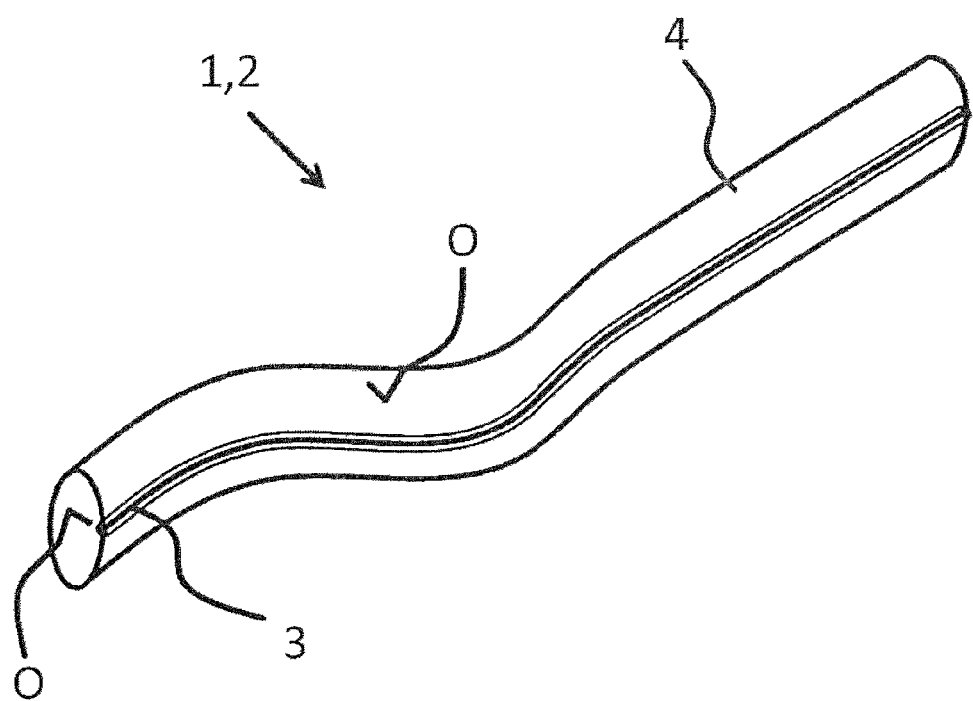
FIG. 1 shows a perspective view of a hybrid pipe.

FIG. 1 shows a perspective view of a hybrid pipe 1. The hybrid pipe 1 comprises a basic element 2, which has at least one portion which is formed as a laminate 3 from a plastics foam material and a fiber composite plastic.

The hybrid 1, hereinafter also referred to, in short, as a pipe 1, or the basic element 2, is substantially formed from a plastics foam sheet, or flat plastics foam body, which has been curved into a cylindrical hollow body and forms the wall 4 of the hybrid pipe 1.

Along the butt edge which runs axially on the wall 4 and at which the ends or side edges of the curved plastics foam body butt one against another or one upon another is formed the laminate 3 or the portion configured as a laminate, in which portion the side edges of the bent plastics foam body are bonded together by the fiber composite plastic. As the fiber composite plastic can be used, for instance, so-called prepregs, which can be cured under subjection to pressure and temperature and thus, by virtue of the configuration of the laminate 3, bond together the ends of the plastics foam body.

The configuration of the laminate 3 allows, on the one hand, a fixed connection of the ends of the plastics foam body to be achieved and, on the other hand, the mechanical strength, the viscoelastic properties, like the dimensional stability, in particular the dimensional stability in the longitudinal direction of the basic element, to be improved.

The shown hybrid pipe 1 is suitable, in particular, for applications in air conditioning systems and aircraft air conditioning pipe installations in aircraft, for, in particular through the use of the plastics foam material, the hybrid pipe 1 has a markedly reduced weight in comparison to conventional pipes. This latter is based, in particular, also on the fact that the basic element can be configured in a laminate-free manner outside of the region configured as a laminate 3, i.e. can have laminate-free surface portions O. Laminate-free surface regions O are labeled consistently in the figures with the reference symbol O, though respectively not all laminate-free surface regions are labeled in the figures.

Furthermore, the wall 4 produced from the plastics foam material exhibits heat insulating properties, so that an additional measure for thermal insulation of the hybrid pipe can be waived.

Figure 2:
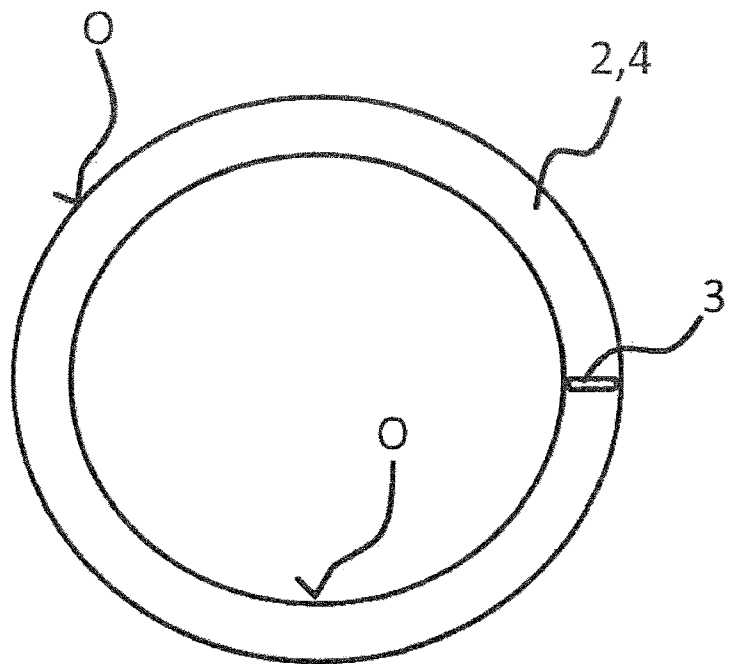
FIG. 2 shows a cross-sectional representation of the hybrid pipe.

FIG. 2 shows a cross-sectional representation of the hybrid pipe 1. From the cross-sectional representation, the structure and shape of the portion formed as a laminate 3 is more clearly apparent. In the present embodiment, the ends or edges of the tubularly curved plastics foam body are butted squarely one against the other, wherein the fiber composite plastics material is disposed between the ends or edges. As can be seen, the fiber composite material, and thus the forming or formed laminate 3, is found merely between the ends of the plastics foam body. Outside of the laminate or the portion configured as the laminate 3, the basic element 2 is formed from the plastics material.

By virtue of the laminate 3, the ends or edges are in the bonded state or are bonded together. An appropriate bonding is absolutely sufficiently stable for air conditioning and/or ventilation applications. Where necessary, however, the bonding can be made yet more stable and firmer, which is discussed in still further detail below in connection with FIGS. 3 to 5.

Figure 3:
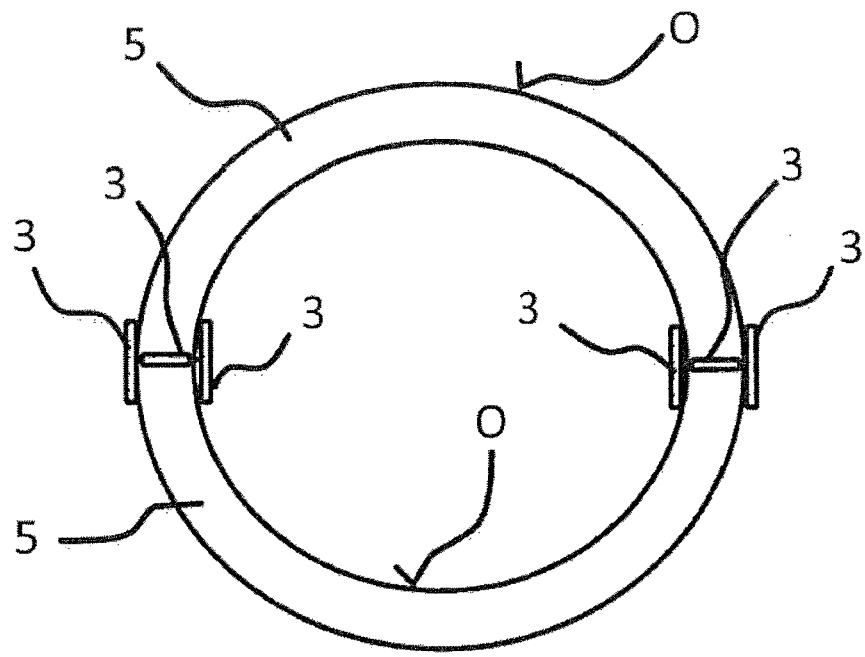
FIG. 3 shows a cross-sectional representation of a variant of the hybrid pipe.
Figure 4:
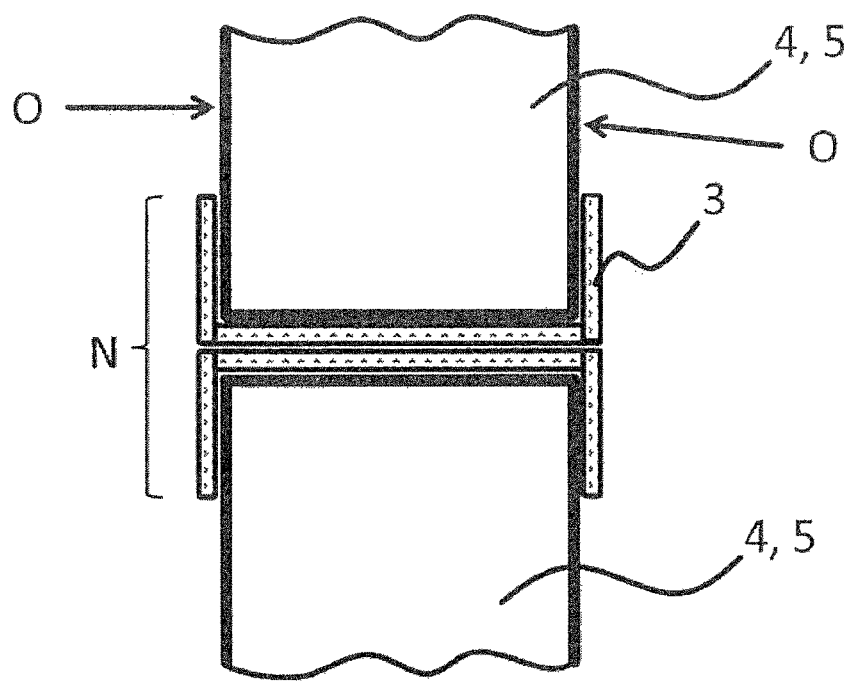
FIG. 4 shows a seam portion of the hybrid pipe.

FIG. 3 shows a cross-sectional representation of a variant of the hybrid pipe 1, and FIG. 4 shows a seam portion, i.e. an enlarged representation of the seam N or joint of the hybrid pipe 1. In this variant, the basic element 2 or the wall 4 is formed by two half shells 5. In the present example, the side edges of the half shells 5 are butted squarely one against the other and are mutually connected into a tubular body. In the present case, the connection of the side edges of the half shells comprises a plurality of portions configured as a laminate 3, which portions, depending on the configuration, can also be regarded however as a continuous laminated portion.

In the example of FIG. 3, fiber composite plastics material is found between the mutually abutting side edges of the plastics foam material. Additionally, and unlike in FIG. 2, the fiber composite plastics material is found on the inside and outside of the wall 4 along the butt edges of the half shells 5, the fiber composite plastics material overlapping the butt edges by a predefined width. In this respect, the portions which are configured as a laminate 3 and join together the plastics foam bodies are located between the butt edges, and with respectively predefined, and substantially freely selectable widths, along the inside and outside of the butt edges. In the present example, the portions configured as a laminate 3 are chosen such that a substantially symmetrical arrangement is obtained. This is particularly advantageous for the dimensional stability, in particular in connection with the production of the laminates 3, since the occurrence of anisotropic tensions or stresses in the region of the laminates 3 can be avoided.

It should here be mentioned that, in one variant, the laminate 3 present between the butt edges of the half shells can be replaced or supplemented by another type of connection, in particular by a bonding or a bond seam with adhesive and/or by a welding or weld seam.

It should be noted that the type of connection which is shown in FIG. 3 can also be used if the hybrid pipe comprises, apart from the seam N, only a continuous plastics foam body or if the hybrid pipe 1 comprises a plurality of plastics foam bodies which respectively form part-shells. It should further be noted that corresponding connections, in particular connections which overlap the butt joints and or the butt seams, can be used in hybrid components different from pipes.

Figure 5:
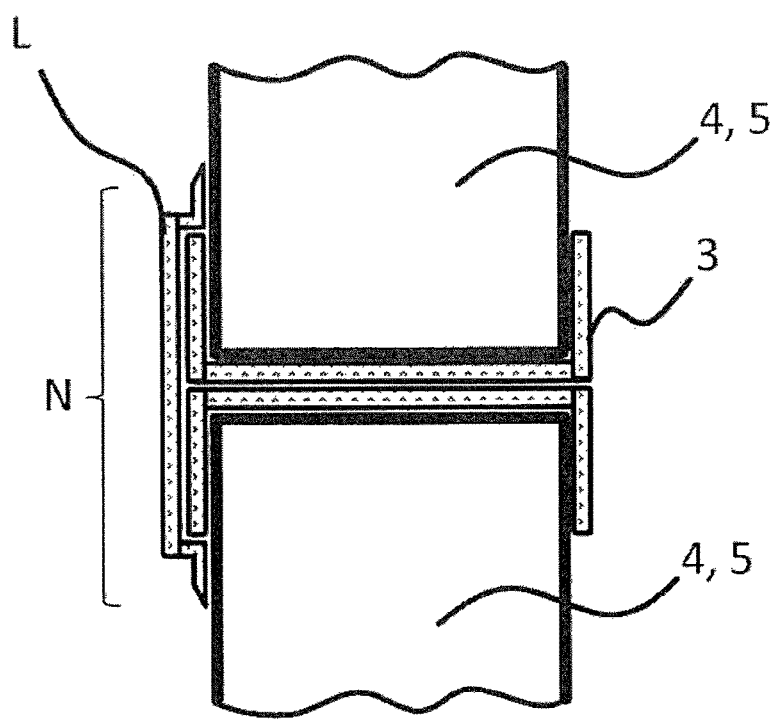
FIG. 5 shows a further seam portion of a further variant of the hybrid pipe.

FIG. 5 shows a seam portion or the seam N of a further variant of the hybrid pipe 1. Unlike in FIG. 3 and FIG. 4, on one side of the basic element, in the region of the seam N, is provided a further layer L of fiber plastics material, which overlaps the layers of fiber plastics material which are already present in accordance with the embodiments of FIG. 3 and FIG. 4. By virtue of the further layer L of fiber plastics material, the connection in the region of the seam N can be further stabilized and strengthened. The further layer L can be provided either on an inner side of the basic element 2 or on an outer side of the basic element 2. Alternatively, it is possible for respectively a further layer L to be present or provided on the inner and also on the outer side.

Figure 6:
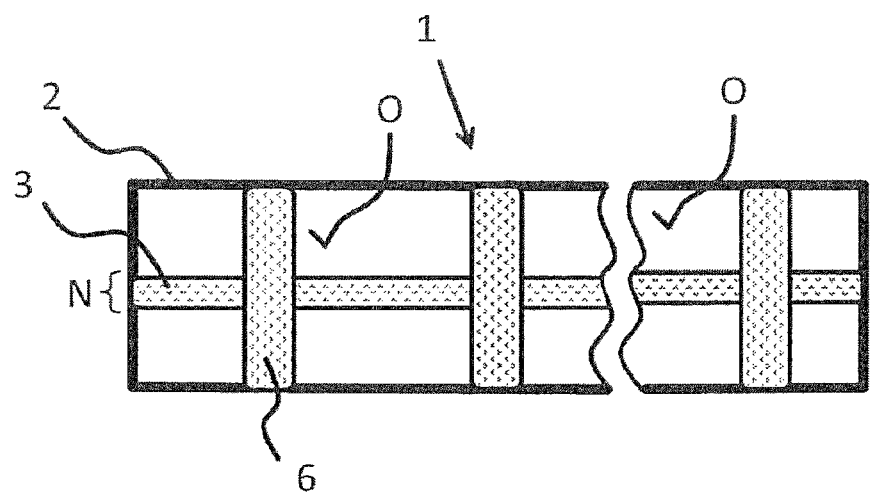
FIG. 6 shows a side view of a portion of a further variant of the hybrid pipe.

FIG. 6 shows a side view of a portion of a further variant of the hybrid pipe 1. In the present hybrid pipe 1, the portion configured as a laminate 3 can be configured in the region of the seam N, in accordance with the hybrid pipes 1 shown in FIGS. 3 to 5. An embodiment in accordance with the variant according to FIG. 2 is also possible. Contrary or in addition to the previously shown laminate regions 3, the hybrid pipe 1 of FIG. 6 has further portions configured as a laminate, i.e. further laminates 6. In the present example, the further laminates 6 are configured such that they radially encompass the basic element 2, and serve substantially as mechanical reinforcements and stiffenings of the basic element in the peripheral direction. In the regions of the laminates 3 and further laminates 6, the flexibility of the basic element is restricted in favor of mechanical stability and strength, while, outside of the laminates 3 and further laminates 6, the flexibility of the plastics foam material is between less and not at all restricted. For these reasons in particular, a sufficiently mechanically stable and dimensionally stable hybrid component, which, with regard to the end shape and end geometry, is not entirely stiff, but is still flexible within certain boundaries, can be provided.

Figure 7:
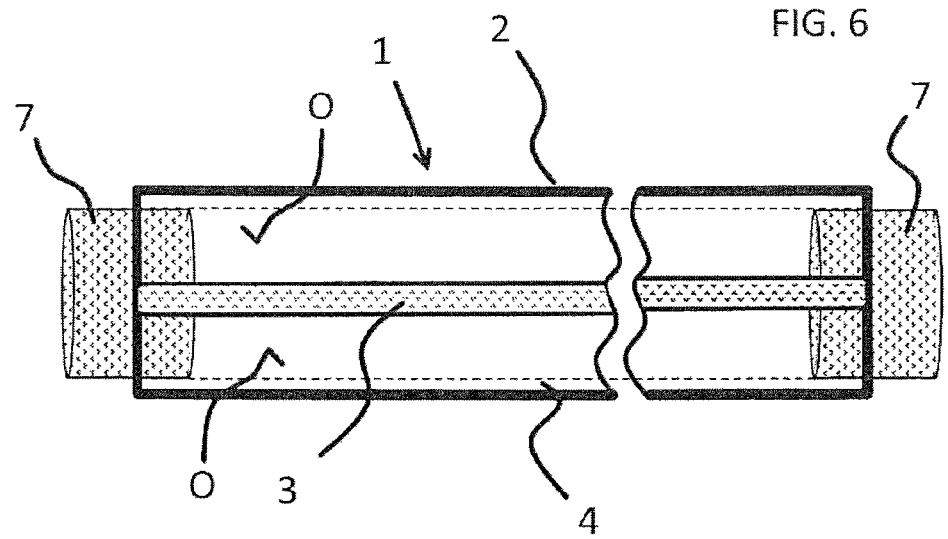
FIG. 7 shows a side view of a portion of a still further variant of the hybrid pipe.

FIG. 7 shows a side view of a portion of a further variant of the hybrid pipe 1. It is here pointed out that, in the further variant according to FIG. 7, those details and features which are described in connection with FIG. 2 to FIG. 6, yet are not represented and shown in FIG. 7, can be implemented singly or in combination, according to requirement.

The hybrid pipe 1 of FIG. 7 differs from the previously shown hybrid pipes 1 substantially in that, at the two ends of the basic element 2, an axial flange 7 is respectively present. The axial flanges 7 are formed from fiber composite plastics materials in cured form. The axial flanges 7 project beyond the axial ends of the basic element 2, the protruding flange portions being able to be connected to further pipes or pipeline elements. Apart from providing a connection option to further pipes or pipeline elements, the axial flanges 7 also provide a mechanical stiffening or reinforcement of the axial ends of the plastics foam material.

In the present example, the axial flanges 7 are connected to the inner side of the wall 4, to be precise by virtue of the fact that the fiber composite material of the axial flanges 7 with the plastics foam material are mutually connected by lamination. In this respect, in the present example, portions configured as a laminate are present at the ends of the plastics foam body in the region of the overlap with the fiber plastics material of the axial flanges 7. It should be noted that, in place of an axial flange 7, a radial flange (not shown) can also be present.

FIG. 8 shows a perspective view of a hybrid component 8. The hybrid component 8 is configured as a half shell for the production of an air outlet of an aircraft cabin air conditioning system. The hybrid component comprises a first segment 9, which forms a pipe half shell, and a second segment 10, which adjoins a longitudinal side of the first segment 9 and is of roughly plate-like configuration. On outer edges of the second segment 10 mounting flanges 11 are present, while on the longitudinal side of the second segment 10 an airflow edge 12 is configured.

As can be seen, in particular, from FIG. 9, which is shown a sectional representation of the hybrid component 8 of FIG. 8, the first segment 9 and the second segment 10 are mutually connected by a laminate 3 with a fiber composite plastic. Regarding this connection, reference is made to the above statements, which apply analogously here. Connection variants as shown and described in connection with the hybrid pipe 1 can likewise find application here.

The second segment 10 has a layer structure 2 comprising two outer plastics foam layers and an intervening intermediate layer 12 of fiber composite plastic. The plastics foam layers and the intermediate layer are mutually connected through the use of a lamination process. That is to say, in the region of the layer structure a region is present which is configured as a laminate and provides a mechanical reinforcement of the flat, plate-like second segment 10.

Based on the structure of the second segment 10, which is of plate-like construction, it is conceivable within the scope of the invention for laminar hybrid components to be produced with corresponding laminated reinforcement regions. Laminar hybrid components of this kind can be constituted, for instance, by internal trim elements, in particular ceiling trim elements for aircraft cabins. Other interior fitting elements can also be similarly produced, i.e. with a plastics foam body which has laminated reinforcing and/or connecting layers of fiber composite plastics. An advantage of using a plastics foam material also consists in the possibility of produce substantially optionally curved and optionally shaped regions or components which are already thermally insulated by the plastics foam material.

From FIG. 9 it can further be seen that that longitudinal side of the second segment 10 which is facing away from the first segment 9 has a marginal region R which is compressed in comparison to the rest of the hybrid component 8, whereby the thickness of the second segment 10 is locally reduced, in the marginal region R. The reduction in thickness is achieved substantially by a compression of the plastics foam material, wherein the plastics foam material is compressed in the course of the lamination process and, following curing of the fiber composite material, maintains the reduced thickness.

The compressed marginal region R configured as a laminate is adjoined by an edge region K formed solely from fiber composite plastic. This means that the compressed region, in which a hybrid structure of plastics foam and fiber composite plastic still exists, merges in the direction of the margin of the second segment 10 into the edge region K formed purely from fiber composite plastic, which edge region, in contrast to the hybrid structure, can also be termed monolithic. In the present example, the edge region K serves as an air discharge edge.

The plastics foam which is used for the described hybrid components 1, 8 can be constituted by a thermoplastic foam. This can be inserted in one or more blanks into a mold, in particular a low-pressure hose mold, shaped in accordance with the end contour of the hybrid component, together with the fiber composite plastic, in particular prepregs, and following closure of the mold can be pressed against the mold with a suitable pressure hose. By subjecting the arrangement to temperature, the fiber composite plastic can be cured, while, at the same time, the plastics foam is shaped into the end contour given by the mold.

The connection of the plastics foam material can be activated by the fiber composite plastic, by adhesive and/or adhesive strips, which preferably takes place during the subjection to temperature. It is also possible for blanks of plastics foam material to be connected beforehand by means of welding or bonding, and for the thus formed plastics foam body to be brought in a subsequent process into the end shape and be provided with the reinforcements consisting of fiber composite plastic.

REFERENCE SYMBOL LIST 1 hybrid pipe
2 basic element
3 laminate
4 wall
5 half shell
6 further laminate
7 axial flange 8 hybrid component
9 first segment
10 second segment
11 flange
12 intermediate layer
N seam
L further layer
R marginal region
K edge region
O laminate-free surface portion

The invention claimed is:

1. A hybrid component for an aircraft, comprising:
a tubular basic element extending axially between a first axial end of the tubular basic element and a second axial end of the tubular basic element,
wherein the tubular basic element comprises a first portion and a second portion both extending axially between the first axial end and the second axial end of the tubular basic element,
wherein the first portion is formed of a plastics foam and has a first contact surface and a second contact surface both extending axially between the first axial end and the second axial end of the tubular basic element, wherein the first portion extends circumferentially between the first contact surface and the second contact surface,
wherein the second portion is formed of a fiber composite plastic, and the second portion is bonded to both the first contact surface and the second contact surface of the first portion to be circumferentially interposed between the first contact surface and the second contact surface,
wherein the first portion is of a single-layer structure and provides an airtight configuration.

2. The hybrid component as claimed in claim 1, wherein the plastics foam is formed from a plastomer.

3. The hybrid component as claimed in claim 1,
wherein the fiber composite plastic comprises a duromer and at least one of glass fibers, carbon fibers and aramid fibers, and
wherein the fibers exist in the form of at least one of woven fabric, bonded fabric, knitted fabric, lattice fabric and nonwoven fabric.

4. The hybrid component as claimed in claim 3, wherein the melting temperature of the plastics foam is greater than a curing temperature of the duromer.

5. The hybrid component as claimed in claim 1, wherein the plastics foam is constituted by a closed-cell foam material.

6. The hybrid component as claimed in claim 1, wherein the plastics foam has a density between 30 kg/m$^3$ and 75 kg/m$^3$.

7. The hybrid component as claimed in claim 1,
wherein the first portion of the tubular basic element comprises two half shells,
wherein the first half shell has a third contact surface extending axially between the first axial end and the second axial end of the tubular basic element, such that the first half shell circumferentially extends between the first contact surface and the third contact surface;
wherein the second half shell has a fourth contact surface extending axially between the first axial end and the second axial end of the tubular basic element, such that the second half shell circumferentially extends between the second contact surface and the fourth contact surface; and
wherein the first portion further comprises a fiber composite plastic bonded to both the third contact surface and the fourth contact surface to be circumferentially interposed between the third contact surface and the fourth contact surface.

8. The hybrid component as claimed in claim 1, wherein the fiber composite material of the second portion varies in thickness in the normal direction of the tubular basic element, and the plastics foam is compressed.

9. A hybrid pipe for air conditioning applications, configured as a hybrid component as claimed in claim 1.

10. A cabin trim element for aircraft cabins, configured as a hybrid component as claimed in claim 1.

11. A method for producing a hybrid component as claimed in claim 1, wherein a plastics foam element and a fiber composite plastics element are connected to each other in a lamination process.

12. The hybrid component as claimed in claim 2, wherein the plastomer comprises at least one of PVDF and PPSU.

13. The hybrid component as claimed in claim 1, wherein the plastics foam has a density between 30 kg/m$^3$ and 40 kg/m$^3$.

* * * * *